US008066563B1

(12) United States Patent
Schultz et al.

(10) Patent No.: US 8,066,563 B1
(45) **Date of Patent: *Nov. 29, 2011**

(54) METHOD FOR ENHANCING WINNING OUTCOMES IN A REEL SPINNING GAME

(75) Inventors: David B. Schultz, Henderson, NV (US); Nathanial A. Hammond, Las Vegas, NV (US); Dominic Tiberio, Henderson, NV (US); Michael Shackelford, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1145 days.

This patent is subject to a terminal disclaimer.

(21) Appl. No.: 11/463,871

(22) Filed: Aug. 10, 2006

Related U.S. Application Data

(63) Continuation-in-part of application No. 10/957,007, filed on Oct. 1, 2004, now Pat. No. 7,377,850.

(51) Int. Cl.
*A63F 9/24* (2006.01)
*G06F 17/00* (2006.01)

(52) U.S. Cl. ................ 463/20; 463/16; 463/17; 463/18; 463/19; 463/21; 463/22; 463/25

(58) Field of Classification Search .............. 463/16–20, 463/21–22, 25
See application file for complete search history.

(56) References Cited

U.S. PATENT DOCUMENTS

| | | | | |
|---|---|---|---|---|
| 6,634,945 | B2 * | 10/2003 | Glavich et al. | 463/25 |
| 6,832,957 | B2 * | 12/2004 | Falconer | 463/20 |
| 2004/0082373 | A1 * | 4/2004 | Cole et al. | 463/13 |

* cited by examiner

*Primary Examiner* — Sunit Pandya
(74) *Attorney, Agent, or Firm* — Steptoe & Johnson LLP

(57) ABSTRACT

Various embodiments are directed to a reel spinning game having one or more shared award-modifier reels that enhance any winning outcome in a reel spinning game.

16 Claims, 9 Drawing Sheets

FIG. 7
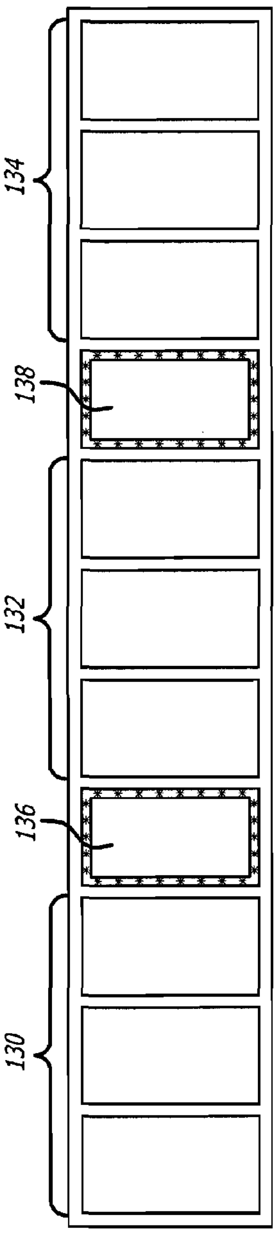
FIG. 8
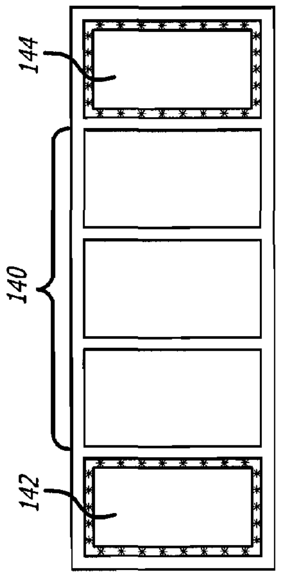
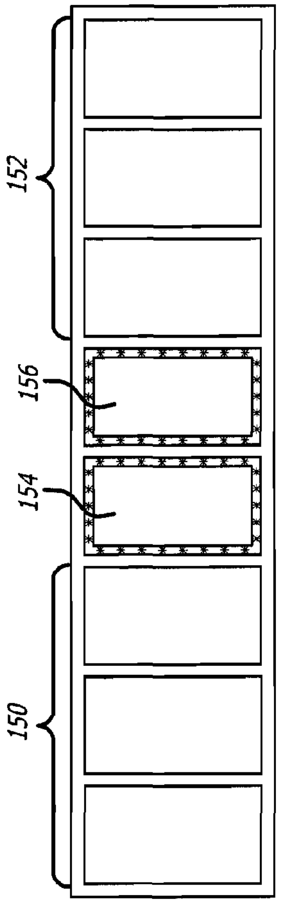
FIG. 9

METHOD FOR ENHANCING WINNING OUTCOMES IN A REEL SPINNING GAME

CROSS-REFERENCE TO RELATED APPLICATIONS

This application is a continuation-in-part of U.S. application Ser. No. 10/957,077 filed Oct. 1, 2004, now U.S. Pat. No. 7,377,850 which is herein incorporated by reference in its entirety. This application is related to co-pending U.S. patent application Ser. No. 11/463,868 filed Aug. 10, 2006.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

Various embodiments are directed to a reel spinning game having one or more shared award-modifier reels acting to enhance any winning outcomes in a reel spinning game.

BACKGROUND

A standard slot machine includes between three and five rotatable reels for use in game play. On the periphery of each reel are gaming symbols, such as assorted fruit, numbers, and/or bar symbols. The reels are caused to spin until each reel reaches a resting position. The success or failure of the game is then determined by comparing the combination of reel symbols that are displayed when the reels are in their resting positions.

To add interest to the game, many different types of slot machines have developed over time. For example, in some slot machines the display windows show more than one adjacent symbol on each reel, thereby allowing betting involving multiple rows. Other types of slot machines have also been developed to increase player interest that include “second chance” games. Typically, “second chance” games try to maintain player interest from a first game segment to a second game segment by providing the player with another opportunity to win.

Additionally, a variety of bonus games have been produced in which a slot machine pays out a final award by adding a single value to, or multiplying a basic slot machine pay award. One such game is a 4-reel slot machine. In such a game, the first three reels embody a basic slot machine game with base pays published on a pay table. For example, 3 bars might pay 10 credits. The 4th reel contains bonus actions that are applied to any base pay if a valid base pay and a bonus action appears on the pay line at the same time. Thus, in one example, the base pay might be multiplied by 10, have 100 added to its value, or respin a random number of times, thereby accumulating some random multiple of the base pay.

Others have produced bonus devices such as secondary wheel games or top box games to provide a bonus game that produces a payment or adds to a base pay on the basic slot machine. These add-on games are more complicated for players to understand and more expensive to produce.

However, there is a continuing need for additional slot machine variants that provide a player with enhanced excitement and diversity of game play, without departing so far from the original slot gaming concept that player comfort is lost. Further, there is a continuing need for a gaming machine that provides increased player excitement due to the visual entertainment that occurs specifically in response to the player’s actions. Additionally, there is a continuing need for a gaming machine that provides maintains a high rate of game play speed so that the number of games played is not substantially reduced by the variation from the original slot gaming concept. Accordingly, those skilled in the art have long recognized the need for a gaming machine that addresses these issues. This invention clearly fulfills these and other needs.

SUMMARY

Briefly, and in general terms, the invention resolves the above and other problems by providing a gaming machine having a base game and two or more base award modifiers operating independently or simultaneously (i.e., two or more base award modifiers operating independently or in conjunction with one another to modify a base game award). The gaming machine includes: indicia of a plurality of spinning reels employed in a base game, indicia of at least one spinning reel employed as a first base award modifier, and indicia of at least one spinning reel employed as a second base award modifier.

Preferably, the base game includes indicia of a plurality of spinning reels that are spun in the base game. The outcome of the indicia of spinning reels defines a base game award, if any. Preferably, the first base award modifier includes indicia of at least one spinning reel that is spun during the first base award modifier. The outcome of the at least one spinning reel indicia in the first base award modifier defines a first modifier award, if any. The first modifier award adjusts the base game award. Preferably, the second base award modifier includes indicia of at least one additional spinning reel that is spun during the second base award modifier. The outcome of the at least one addition spinning reel indicia in the second base award modifier defines a second modifier award, if any. The second modifier award adjusts the combined base game award and the first modifier award if both awards were given, adjusts only the base game award if only the base game award was given, and adjusts only the first modifier award if only the first modifier award was given. Thus, the first modifier award and the second modifier award operate independently or in conjunction with one another to modify a base game award.

In accordance with another aspect of a preferred embodiment, the outcome of the indicia of a plurality of spinning reels, the outcome of the indicia of the at least one spinning reel, and the outcome of the indicia of the at least one additional spinning reel, are all displayed along a payline. In one preferred embodiment, the indicia of a plurality of spinning reels spins about a substantially horizontal axis, and at least one spinning reel of the base award modifiers spins about a substantially vertical axis. In another preferred embodiment, the indicia of a plurality of spinning reels spins about a substantially horizontal axis, and at least one of the base award modifiers spins in a top box game. In accordance with another aspect of a preferred embodiment, the base game requires three coins to initiate base game play, the first base award modifier requires a forth coin to initiate the first modifier play, and the second base award modifier requires a fifth coin to initiate second modifier play.

In accordance with another aspect of a preferred embodiment, any first modifier award from the first base award modifier is added to any base game award from the base game. In accordance with another aspect, a first modifier award from the first base award modifier is awarded only if a base game award was given. In accordance with still another aspect, a first modifier award from the first base award modifier is awarded regardless of whether a base game award was given. In accordance with yet another aspect, a first modifier award from the first base award modifier rewards a player with additional reel spins. In another preferred embodiment, a second modifier award from the second base award modifier is a multiplier of the base pay award, if any, and the first modifier award, if any.

In accordance with another preferred embodiment, the gaming machine also has a base game and two or more base award modifiers operating independently or in conjunction with one another to modify a base game award. Specifically, this preferred embodiment of the gaming machine includes a base game, a first base award modifier, and a second base award modifier. The outcome of the base game defines a base game award, if any. The outcome of the first base award modifier defines a first modifier award, if any. Preferably, the first modifier award adjusts the base game award, if any. The outcome of the second base award modifier defines a second modifier award, if any. Preferably, the second modifier award adjusts the combined base game award and the first modifier award if both awards were given, adjusts only the base game award if only the base game award was given, and adjusts only the first modifier award, if only the first modifier award was given. In this manner, the first modifier award and the second modifier award operate independently or in conjunction with one another to modify a base game award.

In accordance with another preferred embodiment, the gaming machine includes: a base game presentation of a plurality of spinning reels, a first base award adjuster, and a second base award adjuster. In one such preferred embodiment, at least one of the first adjuster awards include a nil adjustment, and at least one of the second adjuster awards includes a nil adjustment. Preferably, the second adjuster award alters the combined base game award and first modifier award if the base game award is given and the second adjuster award is a non-nil adjustment, alters only the base game award if the base game award was given and the second adjuster award includes a nil adjustment, and alters only the first adjuster award if no base game award was given and the first adjuster award is a non-nil adjustment and stands independently of a base game award.

In accordance with another preferred embodiment, the gaming machine includes: a base game presentation of a plurality of spinning reels, a first base award adjuster, and a second base award adjuster. In one such preferred embodiment, at least one of the first adjuster awards include a negative adjustment, and at least one of the second adjuster awards including a negative adjustment. Preferably, the second adjuster award alters the combined base game award and first modifier award if the base game award is given and the second adjuster awards including a non-negative adjustment, alters only the base game award if the base game award was given and the second adjuster award including a negative adjustment, and alters only the first adjuster award if no base game award was given and the first adjuster award stands independently of a base game award.

In accordance with another preferred embodiment, the gaming machine includes: a base game, means for modifying a first base award, and means for modifying a second base award. Preferably, the second modifier award adjusts the combined base game award and first modifier award if both awards were given, adjusts only the base game award if only the base game award was given, and adjusts only the first modifier award if only the first modifier award was given.

In another preferred embodiment, the gaming machine includes indicia of a plurality of spinning reels in both a first and second set of reels, wherein a determination is made as to whether an outcome of the indicia of spinning reels in the first and/or second set of reels is a winning outcome. The gaming machine also includes award-modifying indicia of a first spinning award-modifying reel positioned between the first and second set of reels, wherein the award-modifying indicia modifies the winning outcome on the first set of reels, the winning outcome on the second set of reels, or the winning outcome on both the first and second set of reels.

In another preferred embodiment, the gaming machine includes a game display for presenting a game including a first set of reels, an award-modifying reel initially adjacent to the first set of reels, and a second set of reels adjacent to the award modifying reel, wherein the award-modifying reel enhances any winning outcomes in the first and/or second set of reels. The gaming machine also includes a player input device that allows a player to adjust the location of the award-modifying reel, and a game controller in communication with the game display and the player input device, wherein the game controller manages the game.

In addition to various gaming machine embodiments, methods for enhancing a winning outcome in a game are also disclosed herein. According to one method, the game includes a first set of reels, a second set of reels, and an award-modifying reel that is shared by the first and second set of reels. Once player input selecting a wager amount and a number of pay lines is received, a game outcome is initiated by spinning at least the first set of reels and the award-modifying reel. A determination is then made as to whether the game outcome of the first set of reels is a winning outcome. If the game outcome is a winning outcome, the winning outcome is enhanced by any award-modifying symbol present on the award-modifying reel.

Other features and advantages of the present invention will become apparent from the following detailed description, taken in conjunction with the accompanying drawings, which illustrate by way of example, the features of the present invention.

BRIEF DESCRIPTION OF THE DRAWING

FIG. 7 illustrates a screen shot of one embodiment of a shared award-modifier game having two shared award-modifier reels;

FIG. 8 illustrates a screen shot of another embodiment of a shared award-modifier game;

FIG. 9 illustrates a screen shot of yet another embodiment of a shared award-modifier game;

DETAILED DESCRIPTION

Figure 1:
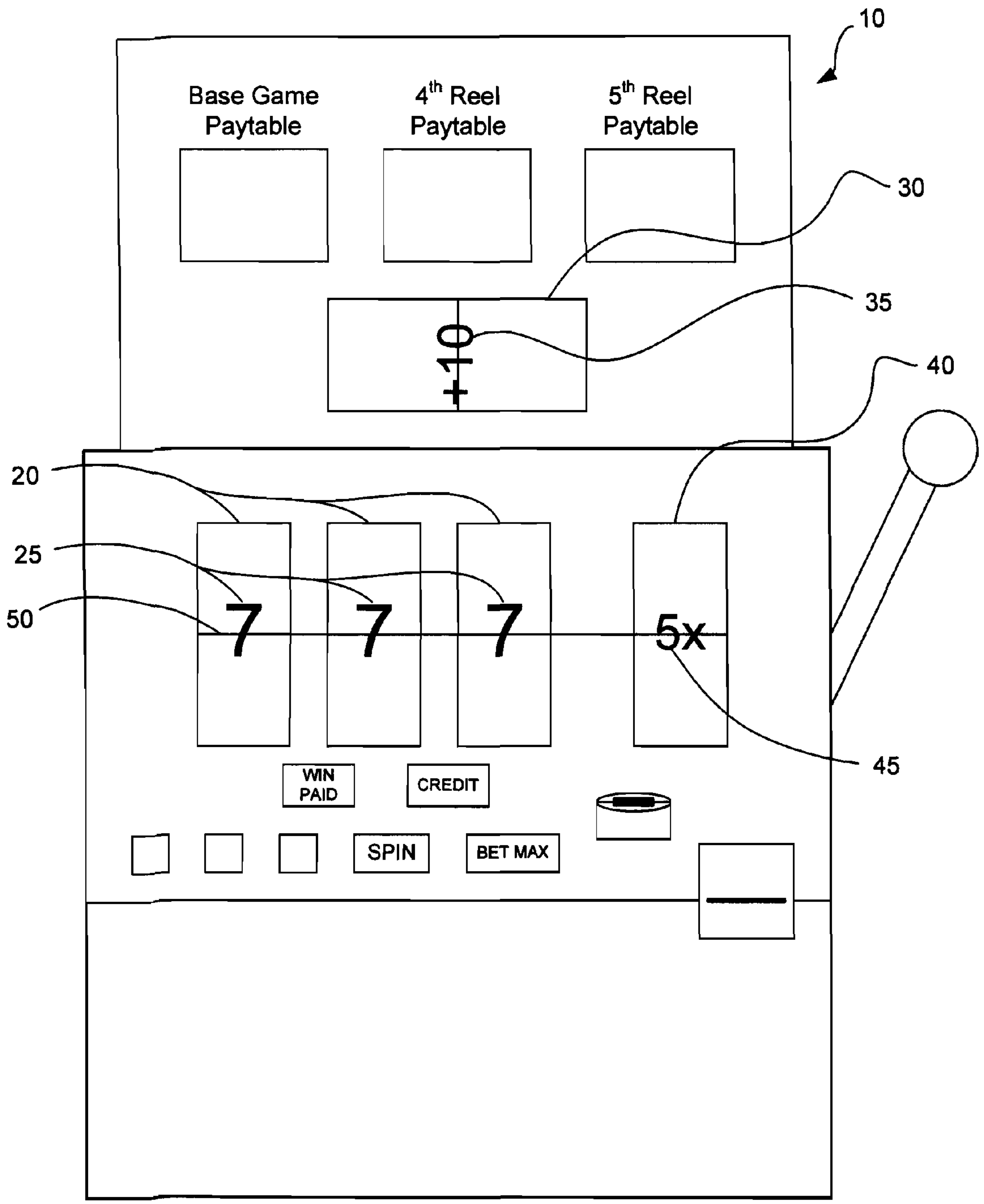
FIG. 1 illustrates a front view of a preferred embodiment of a multiple bonus modifier game, constructed in accordance with the claimed invention, having a base game and two or more base award modifiers operating independently or simultaneously of each other.

A preferred embodiment gaming machine, implemented in accordance with the claimed invention, provides a player with the opportunity to play a base game in conjunction with two or more base award modifiers that operate independently or in conjunction with one another to modify a base game award. In this manner, player excitement is derived and heightened from the visual entertainment that occurs when the multiple base award modifiers act to increase the opportunities for a player to win, as well as the magnitude of those winnings. Referring now to the drawings, wherein like reference numerals denote like or corresponding parts throughout the drawings, and more particularly to FIGS. 1-2, there is shown a preferred multiple bonus modifier game 10.

Referring now to FIG. 1, a multiple bonus modifier game 10 preferably includes a base game and two or more base award modifiers operating independently or simultaneously of each other (i.e., the two or more base award modifiers operate independently of each other or in conjunction with each other to modify a base game award). Specifically, the multiple bonus modifier game 10 comprises: a base game 20 that includes a plurality of spinning reels, a first base award modifier 30 that includes at least one spinning reel, and a second base award modifier 40 that includes at least one additional spinning reel. It will be appreciated by those of skill in the art that whenever spinning reels are described herein, any indicia of spinning reels may be used without departing from the scope of the claimed invention. Such indicia of spinning reels include, by way of example only, and not by way of limitation, physical spinning reels, a video display of spinning reels, or other gaming presentations of spinning reels.

Preferably, the plurality of reels in the base game 20 is spun (or appears to be spun in the case of video representation embodiments). The outcome of the spinning reels in the base game 20 defines a base game award 25, if any (i.e., the outcome does not always produce an award). Additionally, the reel in the first base award modifier 30 is also spun. The outcome of the spinning reel in the first base award modifier 30 defines a first modifier award 35, if any (i.e., the outcome does not always produce an award). The first modifier award adjusts the base game award. Further, the at least one additional reel in the second base award modifier 40 is also spun. The outcome of the additional spinning reel in the second base award modifier 40 defines a second modifier award 45, if any (i.e., the outcome does not always produce an award). The second modifier award 45 (1) adjusts the combined base game award 25 and first modifier award 35 if both awards were given, (2) adjusts only the base game award 25 if only the base game award was given, and (3) adjusts only the first modifier award 35 if only the first modifier award was given. Thus, the first modifier award 35 and the second modifier award 45 operate independently or in conjunction with one another to modify a base game award 25.

As briefly described above, in a preferred embodiment of the multiple bonus modifier game 10 the two or more base award modifiers operate independently or simultaneously (in conjunction) with each other and the base award 25. Operating "independently" in this context means that each award will stand independently, regardless of whether or not another award was won. Specifically, if a base game award 25 was won, a first modifier award 35 was won, and a second modifier award 45 was lost, the base game award 25 and the first modifier award 35 would be given. If a base game award 25 was won, a first modifier award 35 was lost, and a second modifier award 45 was won, the base game award 25 and second modifier award 45 would be given. Further, in some preferred embodiments, if a base game award 25 was won, a first modifier award 35 was lost, and a second modifier award 45 was lost, the base game award 25 still would be given. Moreover, in other preferred embodiments, if a base game award 25 was lost, a first modifier award 35 was won, and a second modifier award 45 was won, the first modifier award 35 and the second modifier award 45 would be given.

In comparison, operating "simultaneously" or "in conjunction with" in this context means that each award can be given at the same time as another award is given. Specifically, if a base game award 25 was won, a first modifier award 35 was won, and a second modifier award 45 was won, the base game award 25 and the first modifier award 35 and the second modifier award 45 would all be given together in combination. Accordingly, in a preferred embodiment of the multiple bonus modifier game 10, if two bonus modifier awards (e.g., the first base award modifier 30 and the second base award modifier 40) appear on the payline 50 along with a valid base pay, both actions are applied to the base pay. For example, three bars pay out 10 credits in the base game 20. Next, a "+10 credits" symbol is achieved on the fourth reel (i.e., first base award modifier 30). Finally, a "times 2" multiplier is achieved on the fifth reel (second base award modifier 40). All symbols lie on the payline 50. The resulting pay is (10+10) "times 2" or 40 credits. Thus, the multiple bonus modifier game 10 is faster to play than a standard primary game with a "secondary" bonus. Furthermore, the machine is less expensive to produce. Moreover, the payouts are more exciting than a standard primary game with a "secondary" bonus.

In a preferred embodiment of the multiple bonus modifier game 10, the outcome of the plurality of spinning reels in the base game 20, the outcome of the at least one spinning reel in the first base award modifier 30, and the outcome of the at least one additional spinning reel in the second base award modifier 40, are all displayed along a payline 50. Accordingly, in a preferred embodiment, the first three reels depict the basic slot machine game 20 with the base pay published on a pay table. In one exemplary embodiment of the base game 20, three bars pay out 10 credits. Continuing, in this embodiment, the fourth reel 30 and fifth reel 40 produce bonus actions (i.e., modifier awards 35 and 45) that are applied to a base game award 25. In one such example, the base game award 25 is multiplied by 10, has 100 credits added to its value, or another similar modifier.

Figure 2:
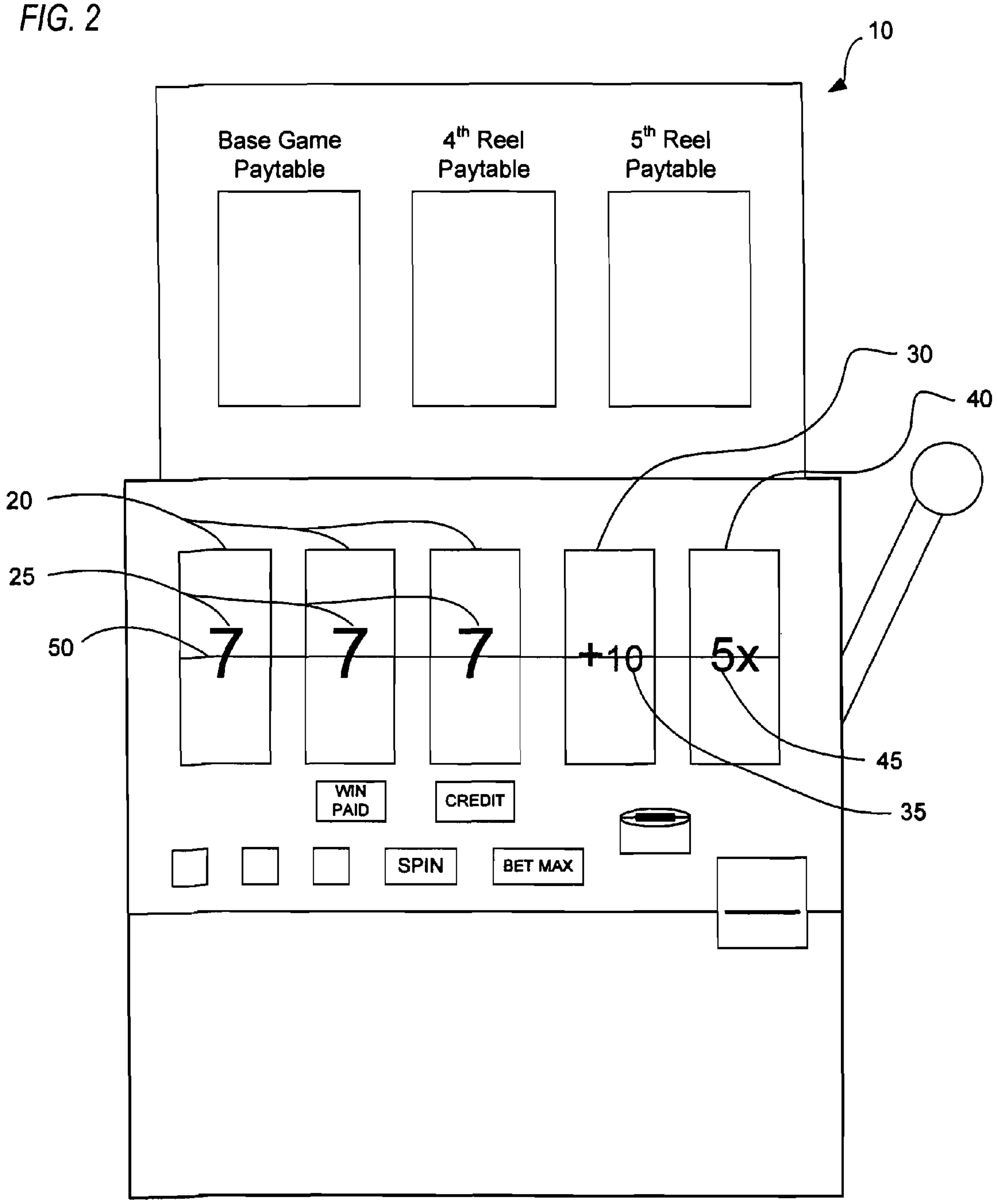
FIG. 2 illustrates a front view of the another preferred embodiment of a multiple bonus modifier game, constructed in accordance with the claimed invention, having reels in a base game and a reel in a second base award modifier spinning about a substantially horizontal axis, while a reel in a first base award modifier spins about a substantially vertical axis.
Figure 3:
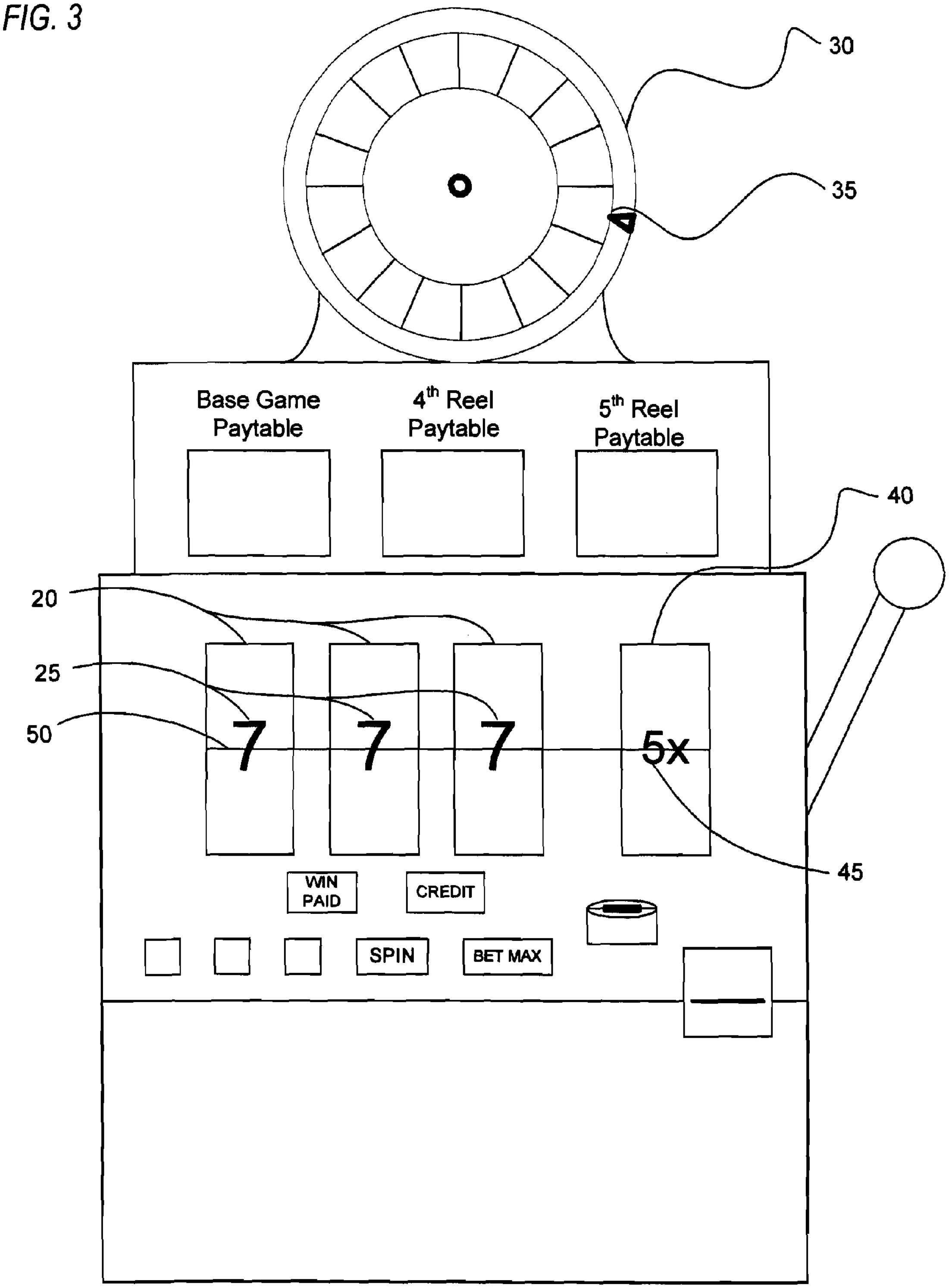
FIG. 3 illustrates a front view of the another preferred embodiment of a multiple bonus modifier game, constructed in accordance with the claimed invention, having reels in a base game and a reel in a second base award modifier spinning about a substantially horizontal axis, while a reel in a first base award modifier spins about a substantially vertical axis.

Additionally, in one preferred embodiment, the spinning reels in the base game 20 spin about a substantially horizontal axis, while at least one reel of the base award modifiers 30 and/or 40 spins about a substantially vertical axis (as shown in FIG. 2). Further, in another preferred embodiment, the spinning reels in the base game 20 spin about a substantially horizontal axis, while a wheel of the base award modifiers 30 and/or 40 spins in a top box game (as shown in FIG. 3). Accordingly, in a preferred embodiment of the multiple bonus modifier game 10, the first base award modifier 30 and/or the second base award modifier 40 include a trigger on one of the reels that can be modified by the other bonus reel. Thus, in one exemplary preferred embodiment, a "Monte Carlo style" bonus wheel could be triggered by a special symbol on the fourth reel (i.e., the first base award modifier) while an additional multiplier could appear on the fifth reel (i.e., the second base award modifier).

Referring again to FIG. 1, in one preferred embodiment of the multiple bonus modifier game 10, any first modifier award 35 from the first base award modifier 30 is then added to any base game award 25 from the base game 20. Additionally, in one preferred embodiment, a first modifier award 35 from the first base award modifier 30 is awarded only if a (non-zero) base game award was given. However, in another preferred embodiment, a first modifier award 35 from the first base award modifier 30 is awarded regardless of whether a base game award 25 was given. Moreover, in one preferred embodiment, a first modifier award 35 from the first base award modifier 30 rewards a player with additional reel spins. In another preferred embodiment, a second modifier award 45 from the second base award modifier 40 is a multiplier of the base pay award 25, if any (i.e., the base pay award 25 is not zero), and the first modifier award 35, if any (i.e., first modifier award 35 is not zero), in combination.

In a preferred "five coin" embodiment of the multiple bonus modifier game 10, the base game 20 requires three coins to initiate base game play, the first base award modifier 30 requires a forth coin to initiate a first modifier play, and the second base award modifier 40 requires a fifth coin to initiate a second modifier play. Accordingly, the player "buys" these bonuses by paying for an extra coin for each of the bonus reels. Thus, in one preferred embodiment of a "five coin" game, the first three coins purchase any base game award from the base game that may appear on reels 1-3. The fourth coin purchases any bonuses that may appear on reel 4. The fifth coin purchases any bonuses that may appear on reel 5. In one preferred embodiment of the multiple bonus modifier game, reel 4 is an "adder" bonus, and reel 5 is a "multiplier" bonus. Since multipliers are generally more powerful than adders, the player is encouraged to insert the 5th coin.

In another preferred embodiment of the multiple bonus modifier game 10, it includes a base game 20, a first base award modifier 30, and a second base award modifier 40, in which at least one of the base game 20, first base award modifier 30, and second base award modifier 40 does not include spinning reels. In all other respects this embodiment of the multiple bonus modifier game 10 resembles the embodiments discussed above. The gaming format utilized in this (at least partially non-spinning reel) multiple bonus modifier game 10 includes by way of example only, and not be way of limitation, poker, various other card games, and the like. It will be appreciated by those skilled in the art that other known gaming formats may also be utilized.

In another preferred embodiment of the multiple bonus modifier game 10, at least one of the first modifier awards 35 from the first base award modifier 30 rewards a player with a nil adjustment. Correspondingly, at least one of the second modifier awards 45 from the second base award modifier 40 rewards a player with a nil adjustment. In this context, a "nil adjustment" is an "award" that does not alter the original base award 20 (e.g., adding zero to a base award, multiplying a base award times one, and the like).

In still another preferred embodiment of the multiple bonus modifier game 10, at least one of the first modifier awards 35 from the first base award modifier 30 gives a player a negative adjustment. Correspondingly, at least one of the second modifier awards 45 from the second base award modifier 40 gives a player a negative adjustment. In this context, a "negative adjustment" is an "award" that negatively alters the original base award 20 (e.g., subtracting credits from a base award, multiplying a base award times a fraction, and the like).

A preferred embodiment of the multiple bonus modifier game 10 includes multiple bonus reels working independently and/or in conjunction with one another to modify a base game award. One preferred embodiment utilizes a stepper-motor slot system with five spinning reels. However, as stated above, in another preferred embodiment, the multiple bonus modifier game 10 is incorporated into a video slot machine having five or more reels.

Another preferred embodiment is directed to a game having a shared award-modifier reel. Generally, the game comprises a first base game having a plurality of reels, a second base game having a plurality of reels, and a shared award-modifier reel positioned between or adjacent to the reels of the first and second base games. During the play of the first or second base game, the shared award-modifier reel is spun. If an award-modifying symbol appears on the award-modifier reel, the award associated with the award-modifying symbol is applied to any winning outcome of the first and/or second base game.

Referring now to FIGS. 4-7, the game comprises a first base game 100 having three reels 102, 104, and 106, a second base game 108 having three reels 110, 112, and 114, and a shared award-modifier reel 116 positioned between or adjacent to the reels of the first and second base games. As shown in FIGS. 4-7, the shared award-modifier reel 116 includes a border to distinguish the award-modifier reel from the reels 102, 104, 106, 110, 112, and 114 of the first and second base games. Alternatively, the shared award-modifier reel (not shown) does not include a border. In another embodiment, the shared award-modifier reel (not shown) is larger than the reels of the first and second base. In yet another embodiment, the shared award-modifier reel (not shown) has a different background color, markings, or patterns to distinguish the shared award-modifier reel from the reels 102, 104, 106, 110, 112, and 114 of the first and second base games 100 and 108, respectively.

Additionally, an award-enhancing symbol 118 is shown on the shared award-modifier reel 116. The award-modifying symbol 118 may be a multiplier symbol (e.g., 2×, 3×, 4×, etc.), wild symbol, additional base game symbol, respin symbol, credit symbol (e.g., pay 10 credits, 100 credits, etc.), free game symbol, secondary game trigger symbol, tangible award symbol (e.g., tickets to shows, cars, jewelry, and the like), or a combination thereof. In other embodiments, sound effects, music, graphics, or animation are associated with or incorporated into the award-modifying symbol 118.

According to one embodiment, upon initiating a game, the shared award-modifier reel 116 and the reels 102, 104, 106, 110, 112, and 114 associated with the first and/or second base games 100 and 108, respectively are spun. Alternatively, the shared award-modifier reel 116 is spun after the reels 102, 104, 106, 110, 112, and 114 of the first or second base game 100 and 108, respectively are spun. The shared award-modifier reel 116 may be stopped before, after, or concurrently with the stoppage of the reels 102, 104, 106, 110, 112, and 114 of the first and second base games 100 and 108, respectively. In another embodiment, the shared award-modified reel 116 is spun once the reels of the first or second base game 100 and 108, respectively have stopped.

Winning outcomes for the first game 100 are determined by reading the pay lines on reels 102, 104, and 106 from left to right. Winning outcomes for the second game 108 are determined by reading the pay lines on the reels 110, 112, and 114 from right to left. However, either set of reels may be read from any appropriate direction. While the first and second games 100 and 108 are played independently, the first and second games share the award-modifier reel 116. Accordingly, any award-modifier symbol 118 appearing on the award-modifier reel 116 may be applied to the winning outcome on pay lines in either or both the first and second base games 100 and 108.

Figure 4:
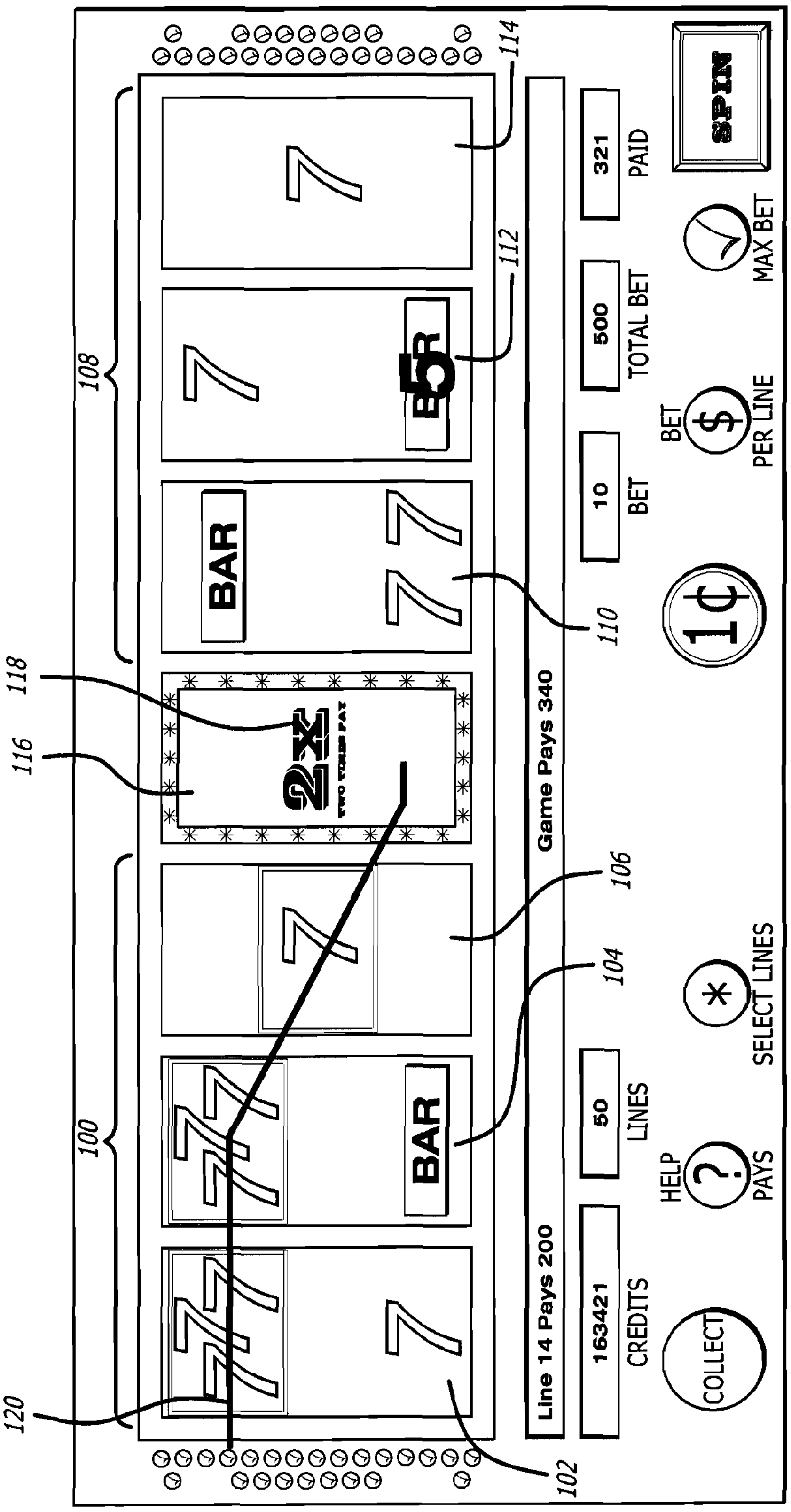
FIG. 4 illustrates a screen shot of one embodiment of a shared award-modifier game having a winning event in a first base game where a shared award-modifier reel enhances the award of the first base game.

FIG. 4 illustrates a screen shot of one possible game outcome where a winning outcome (as delineated by a pay line 120) is presented in the first game 100 and an award-modifier symbol 118 is also presented on the award-modifier reel 116. The award associated with the award-modifying symbol 118 (i.e., the 2× multiplier) is then applied to the winning outcome. As a result, the winning outcome of 100 credits is multiplied by a factor of two for a payout of 200 credits. As shown in FIG. 4, the award-modifier symbol 118 appears in the center of the award-modifier reel 116 and not on the pay line associated with of the first base game 100, yet the award associated with the award-modifier symbol is still applied to the winning outcome of the first base game. That is, the presence of the award-modifier symbol 118 in the shared award-modifier reel 116 results in an enhancement of the winning outcome. However, in alternate embodiments, the award-modifier symbol 118 must appear on a pay line to be applied to a winning outcome in either the first or second base games 100 and 108, respectively. While the screen shot of FIG. 4 shows a single award-modifying symbol 118, a plurality of award-modifying symbols may be shown on the award-modifier reel 116. In one embodiment, more than one award-modifying symbol 118 is presented on the award-modifier reel 116, the award-modifying symbol needs to appear on the same pay line as a winning outcome in the first or second base games 100 and 108, respectively. Alternatively, the award-modifying symbols 118 need not be present on a winning pay line in order to enhance a winning outcome in the first or second base games 100 and 108, respectively.

Figure 5:
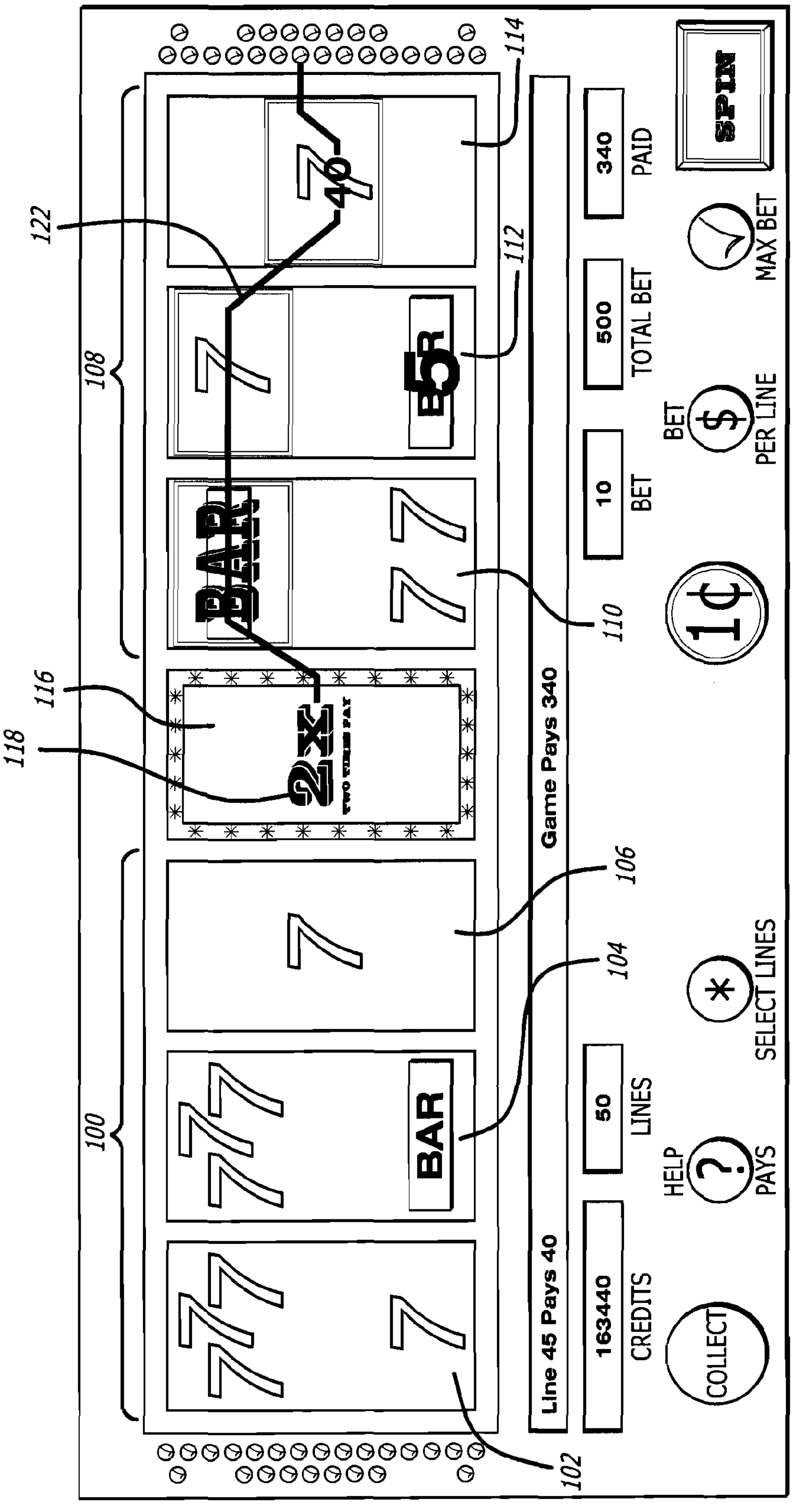
FIG. 5 illustrates a screen shot of another embodiment of a shared award-modifier game having a winning event in a second base game where a shared award-modifier reel enhances the award of the second base game.
Figure 6:
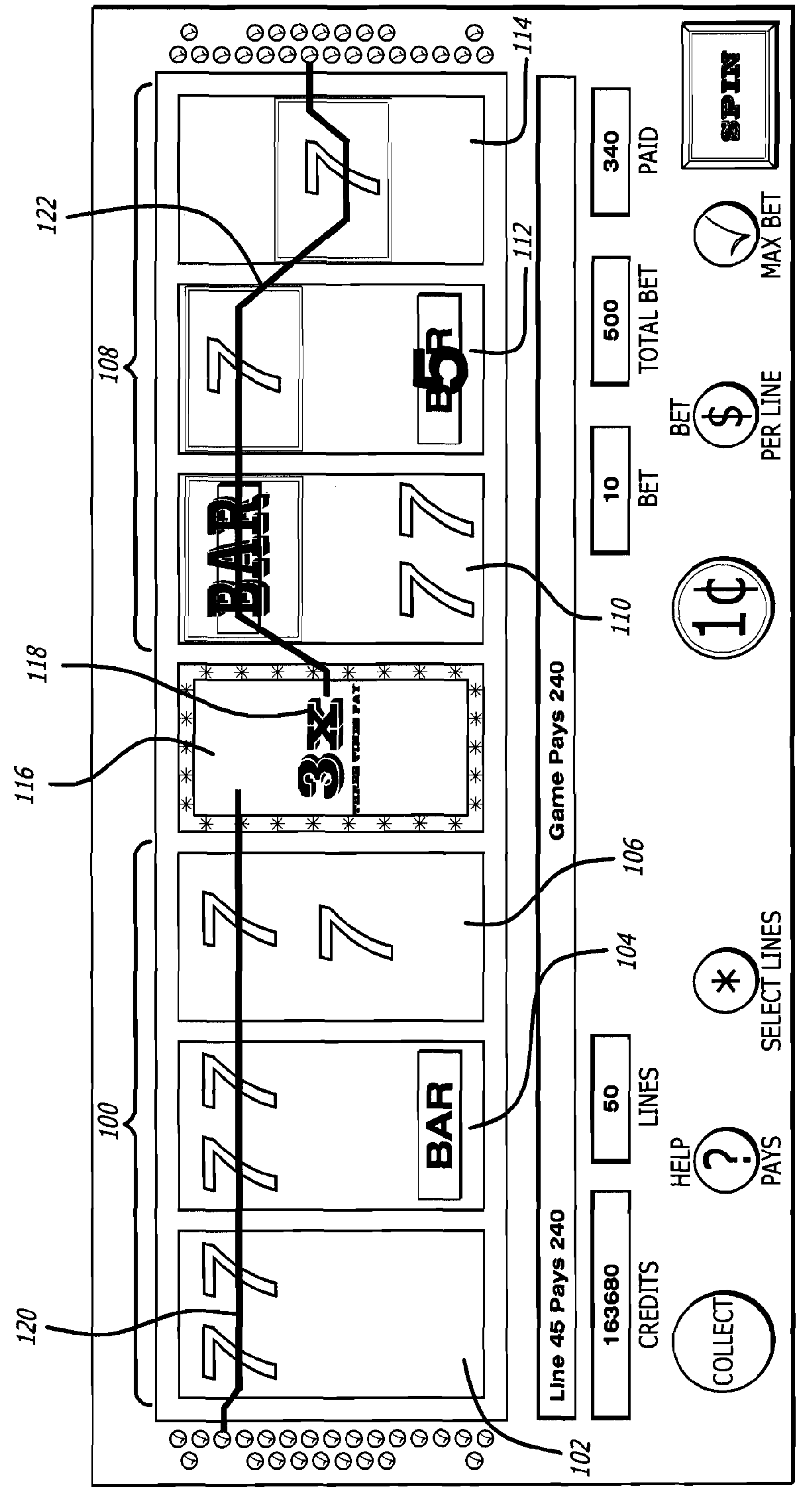
FIG. 6 illustrates a screen shot of yet another embodiment of a shared award-modifier game having winning events in a first and second base game wherein a shared award-modifier reel enhances the awards of the first and second base games.

FIG. 5 illustrates a screen shot of one possible game outcome for the second game 108. A winning outcome is shown by a pay line 122 as the reels 110, 112, and 114 are read from right to left. Additionally, an award-modifier symbol 118 is also presented on the shared award-modifier reel 116. The award associated with the award-modifier symbol 118 (i.e., the 2× multiplier) is then applied to the winning outcome of the second game 108. As a result, the winning outcome of 20 credits is multiplied by a factor of two for a payout of 40 credits. FIG. 6 illustrates a screen shot that combines the game outcomes of FIGS. 4 and 5. That is, the winning outcomes of the first and second base games 100 and 108 may be shown approximately at the same time. Alternatively, the winning outcomes of the first and second base games 100 and 108 may be shown sequentially (as depicted in FIGS. 4 and 5).

As shown in FIGS. 4-6, the first and second games 100 and 108 are games that present a plurality of pay lines. According to one embodiment, the shared award-modifier reel 116 is spun only if the player places a wager on all the pay lines of the game. In another embodiment, the shared award-modifier reel 116 is spun if the player makes a maximum wager on at least one pay line. In alternate embodiment, the shared award-modifier reel 116 is spun regardless of the amount or number of wagers made by the player.

FIG. 7 illustrates another embodiment of a game having a plurality of base games 130, 132, and 134 that are separated by shared award-modifier reels 136 and 138. As shown in FIG. 7, each game has three reels, but those skilled in the art will appreciate that any number of reels for each game is possible. For example, each game may have the same number of reels, different number of reels, or any combination thereof.

Furthermore, the embodiment shown in FIG. 7 is similar to the embodiment disclosed in FIGS. 4-6 except that a second, shared award-modifier reel 138 is placed between the second base game 132 and the third base game 134. Because the second base game 132 is positioned between two shared bonus reels 136 and 138, the second base game may reference either or both the shared bonus reels. Accordingly, winning outcomes in the second base game 132 may be determined by reading the reels from left-to-right, right-to-left, in both directions, or any other appropriate direction. Furthermore, an award symbol appearing in either or both of the shared award-modifier reels 136 and 138 are applied to any winning outcome in the second base game. While the games 130, 132, and 134 are referred to as the first, second, and third games, the use of the adjectives, first, second, and third, is not meant to be limiting. For example, a player's wagers may be applied to the first game, the third game, and then the second game.

FIG. 8 illustrates yet another embodiment of a game having a base game 140 and shared award-modifier reels 142 and 144 on either side of the base game. As shown in FIG. 8, the base game 140 is a three reel game, but those skilled in the art will appreciate that any number of reels (e.g., 2, 4, 5, 6, 7, 9, or more reels) may be provided in the base game. Because the base game 140 is positioned between two shared award-modifier reels 142 and 144, the base game may reference either or both of the shared award-modifier reels. Accordingly, winning outcomes in the base game 140 may be determined by reading the reels from left-to-right, right-to-left, in both directions, or any other appropriate direction. In an alternate embodiment, the player may elect to place both shared award-modifier reels 142 and 144 on one side of the base game 140. That is, before game play begins, the player may select the location of the shared award-modifier reels 142 and 144 (i.e., left or right of the base game reels).

FIG. 9 illustrates another embodiment of a game having first and second base games 150 and 152 and shared award-modifier reels 154 and 156 positioned between or adjacent to the first and second base games. Given the positioning of the award-modifier reels 154 and 156, a winning outcome in either or both base games 150 and 152 may be enhanced by either one or both of the award-modifier reels 154 and 156. For example, a winning outcome in the first base game 150 may be enhanced by an award-enhancing symbol in either of the first or second award-modifier reels 154 and 156. If an award-enhancing symbol appears in both the award-modifier reels 154 and 156, according to one embodiment, the winning outcome of a base game is enhanced sequentially. For example, a winning outcome paying 10 credits is doubled to 20 credits if a 2× multiplier symbol appears in the first award-modifier reel 154 and the enhanced award of 20 credits is further enhanced (e.g., tripled) to 60 credits if a 3× multiplier symbol appears in the second award-modifier reel 156. Alternatively, the award-modifier symbols may be summed together and then applied to the winning outcome in the base game. Using the previous example, the 2× and 3× multipliers are summed together (to net a 5× multiplier) and then applied to the winning outcome of 10 credits to result in a 50-credit award.

Figure 10A:
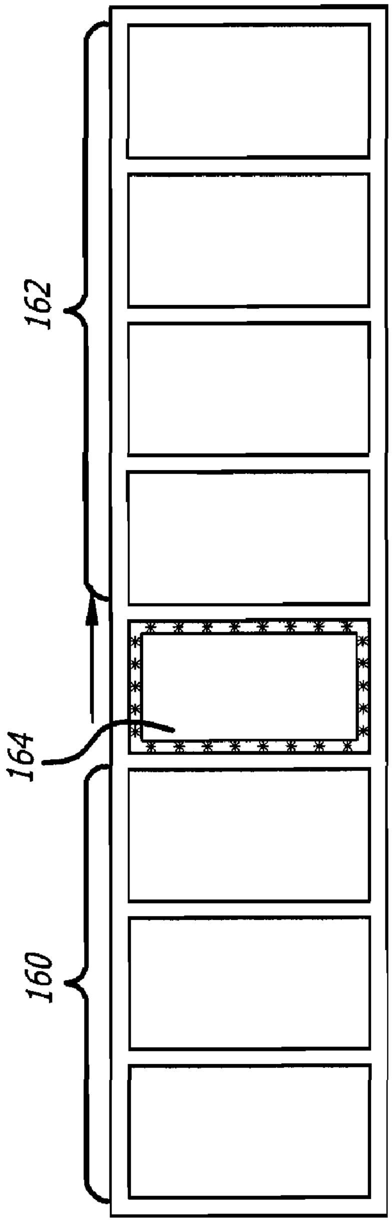
FIG. 10A illustrates a screen shot of another embodiment of a game having a movable shared award-modifier reel.
Figure 10B:
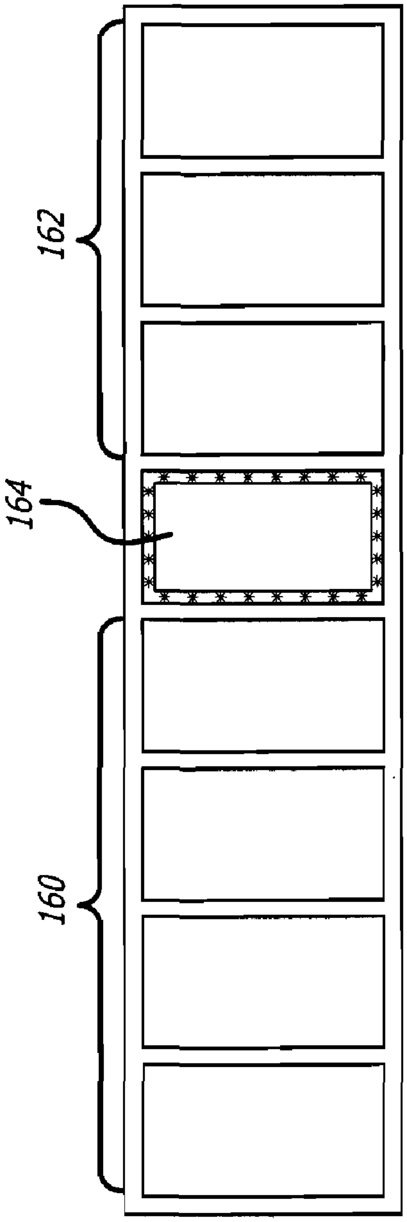
FIG. 10B illustrates a screen shot of FIG. 10A after the shared award-modifier reel is moved.

FIGS. 10A and 10B illustrate yet another embodiment of a game having a plurality of base games 160 and 162 that share a moveable award-modifier reel 164. As shown in FIG. 10A, the award-modifier reel 164 is positioned between or adjacent to a first base game 160 having three reels and a second base game having four reels 162. The award-modifier reel 164 may be moved to a position such that in the direction of the arrow results in a game wherein the first base game 160 has four reels and the second base game 162 has three reels. While FIGS. 10A and 10B show the award-modifier reel 164 moving one position to the right, it is contemplated that the award-modifier reel may be moved to the left, in either direction, or moved more than one position at a time.

According to various embodiments, a player or a game controller may move the award-modifier reel 164. For example, the player may be given the opportunity to move the award-modifier reel 164 prior to initiating the game and/or prior to initiating the spinning of the reels. Alternatively, the player is required to pay for the opportunity and/or place a maximum wager in order to move the award-modifier reel 164. In those embodiments that allow the player to move the location of the award-modifier reel 164, the gaming machine may be provided with one or more switches/buttons, a toggle switch (not shown), mouse, trackball, touch glass, touch screen, joystick, mini-joystick, or other input means known or developed in the art. In another embodiment, a game controller may randomly select the position of the award-modifier reel 164. In yet another embodiment, a gaming establishment operator may set the position of the award-modifier reel 164. Alternatively, the gaming establishment operator may remotely control or set the position of the award-modifier reel 164.

In the embodiments of a game having two or more base games, the second game is initiated in response to a plurality of trigger events. According to one embodiment, the second game is triggered in response to the number and amount of wagers made by a player. For example, a player making a maximum wager on at least one pay line on the first game would trigger the second game. In another embodiment, the second game is triggered when a player wagers on a predetermined number of pay lines. For example, a player making a wager on all the pay lines of the first game would trigger the second game. Alternatively, for example, in a 50-line game where each game has 25 lines, all the pay lines of the second game are selected when the player makes a wager on 26 lines (i.e., all 25 lines in the first game and one pay line in the second game).

Furthermore, in those games that are capable of presenting two or more base games, the mathematical model used to determine the probabilities of winning outcomes for the first base game and any other base games may be varied. Alternatively, the mathematical model of the first and second games is modified such that the payouts for the first and second game are different. In addition to modifying the mathematical model of the first and second games, the first and second games may be two entirely different games that share an award-modifier reel. Accordingly, each game may have different reel layouts, numbers of symbols, and winning combinations, and payouts.

In one embodiment, the above-disclosed games are presented on a gaming machine having a video game display. The game display may be a flat panel display including, by way of example only, and not by way of limitation, liquid crystal, plasma, electroluminescent, vacuum fluorescent, field emission, LCOS (liquid crystal on silicon), and SXRD (Silicon Xtal Reflective display), or any other type of panel display known or developed in the art. These flat panel displays may use panel technologies to provide digital quality images including, by way of example only, and not by way of limitation, EDTV, HDTV, or DLP (Digital Light Processing). Additionally, the game display may also include a touch screen or touch glass system (not shown).

In another embodiment, the game display comprises a plurality of mechanical reels. In yet another embodiment, the game display comprises a combination of mechanical reels and video depictions of reels. For example, the gaming machine may include mechanical reels for the base games and a video depiction of a reel for the shared bonus modifier reel. Alternatively, the base game may be a video depiction of a plurality of reels and the shared bonus modifier a mechanical reel.

Figure 11:
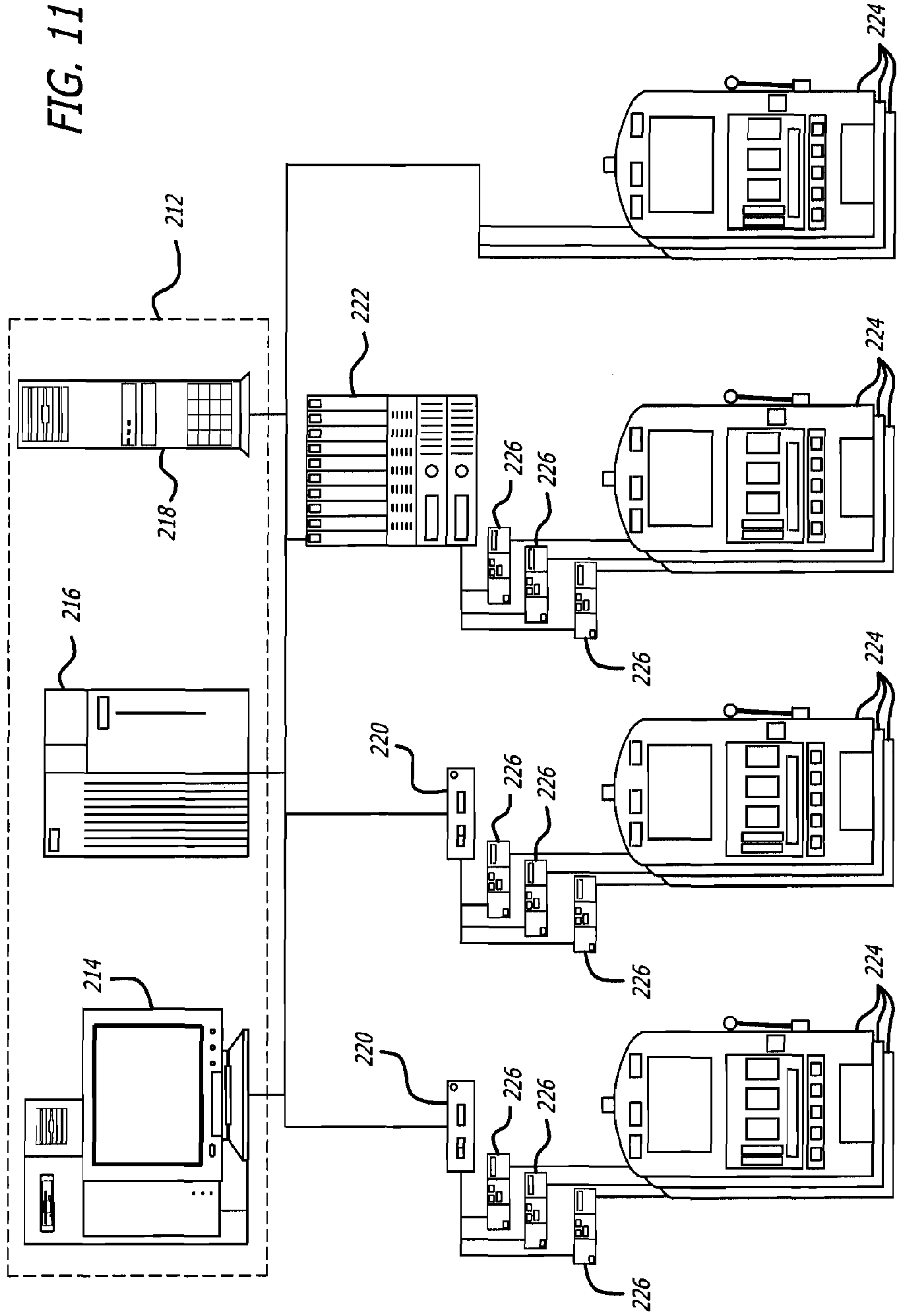
FIG. 11 illustrates one embodiment of a gaming system for use with an embodiment of a gaming machine having a shared award-modifier reel.

In another embodiment, a gaming machine is operatively connected, via a network connection, to a casino gaming system. Referring to FIG. 11, a casino gaming system 210 is shown. The casino gaming system 210 comprises back-end server system 212, network bridges 220, a network rack 222, gaming machines 224 and game management units 226 all connected via a system network.

A variety of types of servers may be included in the back-end server system 212. The type of server used is generally determined by the platform and software requirements of the gaming system. Additionally, the back-end server system 212 may be configured to comprise multiple servers. In one embodiment, as illustrated in FIG. 11, the back-end server system 212 is configured to include three servers. Specifically, servers 214, 216 and 218 form the back-end server system 212, or the back-end servers. In one example, server 214 is a windows based server, server 216 is an IBM RS6000 based server, and server 218 is an IBM AS/400 based server. Of course, one of ordinary skill in the art will appreciate that different types of servers may also be used. The back-end server system 212 performs several fundamental functions. For example, the back-end server system 212 can collect data from the slot floor as communicated to it from other network components and maintain the collected data in its database. The back-end server system 212 may use slot floor data to generate a report used in casino operation functions. Examples of such reports include, but are not limited to, accounting reports, security reports, and usage reports. The back-end server system 212 may also pass data to another server for other functions. Alternatively, the back-end server system 212 may pass data stored on its database to floor hardware for interaction with a game or slot player. For example, data such as a game player's name or the amount of a ticket being redeemed at a game, may be passed to the floor hardware. Additionally, the back-end server system 212 may comprise one or more data repositories for storing data. Examples of types of data stored in the back-end server system data repositories include, but are not limited to, information relating to individual player play data, individual game long-term accounting data, cashable ticket data, sound data including optimum audio outputs for various casino settings. Additionally, animation and graphic files may also be stored in the back-end server system data repositories.

The network bridges 220 and network rack 222 shown in FIG. 11 are networking components. These networking components, which may be classified as middleware, facilitate communications between the back-end server system 212 and the game management units 226. The network bridges 220 concentrate the many game management units 226

(2,000 on average) into a fewer number (nominally 50:1) of connections to the back-end server system 212. Additionally, the network rack 222 may also concentrate game management units 226 into a fewer number (2000:1) of connections to the back-end server system 212. The network bridges 220 and network rack 222 may comprise data repositories for storing network performance data. Such performance data may be based on network traffic and other network related information.

Optionally, the network bridge 220 and the network rack 222 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The gaming machines 224 illustrated in FIG. 1 act as terminals for interacting with a player playing a casino game. In various embodiments, any of the gaming machines 224 may be a mechanical reel spinning slot machine, video slot machine, video poker machine, keno machine, video blackjack machine, or a gaming machine offering one or more of the above described games. Additionally, each gaming machine 224 may comprise one or more data repositories for storing data. Examples of information stored by the gaming machines 224 include, but are not limited to, maintenance history information, long-term play data, real-time play data and sound data. The sound data may include, but is not limited to, audio files, sound clips, .wav files, mp3 files and sound files saved in various other formats. Furthermore, each gaming machine 224 comprises an audio system (not shown) for outputting sound. Typically, the audio system comprises one or more speakers, an amplifier, and access to one or more sound files.

Game management units (GMUs) connect gaming machines to network bridges. The function of the GMU is similar to the function of a network interface card connected to a desktop personal computer (PC). Referring to FIG. 11, a GMU 226 connects a gaming machine 224 to the network bridge 220. Some GMUs 226 have much greater capability and can perform such tasks as calculating a promotional cash-back award for a player, generating a unique ID for a cash redeemable ticket, and storing limited amounts of game and transaction based data. Some GMUs 226 may comprise one or more data repositories for storing data. The types of data stored by the GMUs 226 may include, but is not limited to, real-time game data, communication link performance data, real-time player play data and sound data including sound files and audio clips.

In one embodiment, the GMU 226 is a separate component located outside the gaming machine. Alternatively, in another embodiment, the GMU 226 is located within the gaming machine. Optionally, in an alternative embodiment, one or more gaming machines 224 connect directly to a network bridge 220 and are not connected to a GMU 226.

The back-end server system 212 may further comprise a slot data system (not shown) stored in one or more data repositories. The slot data system is a computerized accounting and machine monitoring system. Optionally, the back-end server system 212 may also comprise a casino management system (not shown). The casino management system provides casinos with a fully integrated, user-friendly software application to manage casino player tracking, promotional, and accounting functions. Features of the casino management system may include player tracking and analysis, table-game management, cage and credit, offer and event management, player club enrollment and redemption, and comprehensive reports and data analysis.

Additionally, the back-end server system 212 may feature a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on a gaming machine 224. These input components (not shown) include, but are not limited to, a slot for receiving a player tracking card, a keypad or equivalent, an electronic button receptor, a touch screen, or the like. The player tracking system may also include a database of all qualified players (i.e., those players who have enrolled in a player rating or point accruing program). Generally, the database for the player tracking system is separate from the gaming machine 224.

In a casino gaming system utilizing a player tracker system, player data may be retrieved from a recognized player to personalize an animated event. For example, in a triggered animated event, information pertaining to the player, such as player name, may be used to customize the animation. Specifically, the animated event may comprise a picture of the player, or the player's name. Additionally, based on the player's status, the player may be entitled to a maximum number of wild symbols when the animated event is triggered. For example, a player having VIP status may be entitled to more wild symbols than a player having non-VIP status.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for enhancing a winning outcome in a game, the method comprising:

providing a game including a first set of reels, a second set of reels, and a shared base game award-multiplier reel positioned between the first and second set of reels, wherein the first set of reels, second set of reels, and the shared base game award-multiplier reel form a contiguous set of reels having a common axis of rotation, and the shared base game award-multiplier reel enhances any winning outcomes in the first and/or second set of reels;

receiving player input selecting a wager amount and a number of pay lines;

initiating a game outcome by spinning at least the first and/or second set of reels and the shared base game award-multiplier reel;

determining whether the game outcome of at least the first and/or second set of reels is a winning outcome; and enhancing the winning outcome of at least the first and/or second set of reels when an award-multiplier symbol is present on the shared base game award-multiplier reel.

2. The method of claim 1, further comprising:

spinning the second set of reels when the received player input is a maximum wager or a selection of all the pay lines of the game;

determining whether the game outcome of the second set of reels is a winning outcome; and enhancing the winning outcome of the second set of reels when an award-multiplier symbol is present on the shared base game award-multiplier reel.

3. The method of claim 2, wherein determining the winning outcome in the first or second set of reels further comprises reading the reels from right-to-left, left-to-right, or a combination thereof.

4. The method of claim 1, further comprising:

spinning the second set of reels in response to player input satisfying a predetermined wager amount or a predetermined number of pay lines of the game;

determining whether the game outcome of the second set of reels is a winning outcome; and enhancing the winning outcome of the second set of reels when an award-multiplier symbol is present on the shared base game award-multiplier reel.

5. The method of claim 4, wherein determining the winning outcome in the first or second set of reels further comprises reading the reels from right-to-left, left-to-right, or a combination thereof.

6. The method of claim 1, further comprising receiving player or gaming establishment operator input adjusting the location of the shared base game award-multiplier reel by selecting one reel of the first or second set of reels.

7. The method of claim 6, further comprising altering at least one pay table in response to the location of the shared base game award-multiplier reel with respect to the first and second set of reels.

8. A method for enhancing a winning outcome in a game, the method comprising:

providing a game including a first set of reels, a second set of reels, and a shared base game award-multiplier reel positioned between the first and second set of reels, wherein the first set of reels, second set of reels, and the shared base game award-multiplier reel form a contiguous set of reels having a common axis of rotation, and the shared base game award-multiplier reel enhances any winning outcomes in the first and/or second set of reels;

receiving player or gaming establishment operator input selecting a location of the shared base game award-multiplier reel within the contiguous set of reels;

determining whether the game outcome of at least the first and/or second set of reels is a winning outcome; and enhancing the winning outcome of at least the first and/or second set of reels when an award-multiplier symbol is present on the shared base game award-multiplier reel.

9. The method of claim 8, wherein determining the winning outcome in the first set of reels further comprises reading the reels from right-to-left, left-to-right, or in both directions.

10. The method of claim 8, further comprising:

spinning the second set of reels when the received player input is a maximum wager or a selection of all the pay lines of the game;

determining whether the game outcome of the second set of reels is a winning outcome; and enhancing the winning outcome of the second set of reels when an award-multiplier symbol is present on the shared base game award-modifying reel.

11. The method of claim 10, wherein determining the winning outcome in the first or second set of reels further comprises reading the reels from right-to-left, left-to-right, or in both directions.

12. The method of claim 8, further comprising:

spinning the second set of reels in response to player input satisfying a predetermined wager amount or a predetermined number of pay lines of the game;

determining whether the game outcome of the second set of reels is a winning outcome; and enhancing the winning outcome of the second set of reels when an award-multiplier symbol is present on the shared base game award-multiplier reel.

13. The method of claim 12, wherein determining the winning outcome in the first or second set of reels further comprises reading the reels from right-to-left, left-to-right, or in both directions.

14. The method of claim 8, further comprising altering at least one pay table in response to the location of the shared base game award-multiplier award modifier reel with respect to the first and second set of reels.

15. A method for enhancing a winning outcome in a game, the method comprising:

providing a game including a first set of reels, a second set of reels, and at least one shared base game award-multiplier reel positioned between the first and second set of reels, wherein the first set of reels, second set of reels, and the shared base game award-multiplier reel form a contiguous set of reels having a common axis of rotation, and the at least one shared base game award-multiplier reel enhances any winning outcomes in the first and/or second set of reels;

receiving player input selecting a wager amount a number of pay lines, and a location of the award-multiplier reel;

initiating a game outcome by spinning at least the first set of reels and the shared base game award-multiplier reel;

configuring a pay table based on the location of the shared base game award-multiplier reel with respect to the first and second set of reels;

spinning the second set of reels in response to player input satisfying a predetermined wager amount or a predetermined number of pay lines of the game;

determining whether the game outcome of the first and/or second set of reels is a winning outcome; and enhancing the winning outcome of the first and/or second set of reels when an award-multiplier symbol is present on the shared base game award-multiplier reel.

16. The method of claim 15, wherein determining the winning outcome in the first and/or second set of reels further comprises reading the reels from right-to-left, left-to-right, or a combination thereof.

* * * * *

UNITED STATES PATENT AND TRADEMARK OFFICE

CERTIFICATE OF CORRECTION

PATENT NO. : 8,066,563 B1
APPLICATION NO. : 11/463871
DATED : November 29, 2011
INVENTOR(S) : David Schultz et al.

It is certified that error appears in the above-identified patent and that said Letters Patent is hereby corrected as shown below:

On first page
Item (75) Inventors, change “Michael” to --Micheal--

Signed and Sealed this
Thirty-first Day of January, 2012

David J. Kappos
*Director of the United States Patent and Trademark Office*